US010789176B2

(12) United States Patent
Wang et al.

(10) Patent No.: US 10,789,176 B2
(45) Date of Patent: Sep. 29, 2020

(54) TECHNOLOGIES FOR A LEAST RECENTLY USED CACHE REPLACEMENT POLICY USING VECTOR INSTRUCTIONS

(71) Applicant: Intel Corporation, Santa Clara, CA (US)

(72) Inventors: Ren Wang, Portland, OR (US); Yipeng Wang, Hillsboro, OR (US); Tsung-Yuan Tai, Portland, OR (US); Cristian Florin Dumitrescu, Shannon (IE); Xiangyang Guo, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 16/059,147

(22) Filed: Aug. 9, 2018

(65) Prior Publication Data

US 2019/0042471 A1    Feb. 7, 2019

(51) Int. Cl.
*G06F 12/123* (2016.01)
*G06F 12/126* (2016.01)
*G06F 12/128* (2016.01)
*G06F 12/0864* (2016.01)
*G06F 12/0891* (2016.01)
(Continued)

(52) U.S. Cl.
CPC ........ *G06F 12/123* (2013.01); *G06F 9/30036* (2013.01); *G06F 12/0864* (2013.01); *G06F 12/0871* (2013.01); *G06F 12/0891* (2013.01); *G06F 12/126* (2013.01); *G06F 12/128* (2013.01)

(58) Field of Classification Search
None
See application file for complete search history.

(56) References Cited

U.S. PATENT DOCUMENTS

| 10,007,615 B1* | 6/2018 | Gazit | G06F 12/0888 |
| 2002/0069323 A1* | 6/2002 | Percival | G06F 12/0813 |
| | | | 711/113 |

(Continued)

OTHER PUBLICATIONS

Abel et al. (Measurement-based Modeling of the Cache Replacement Policy) IEEE: 978-1-4799-0187-6/13, pp. 65-74 (Year: 2013).*

(Continued)

*Primary Examiner* — Kaushikkumar M Patel
(74) *Attorney, Agent, or Firm* — Barnes & Thornburg LLP

(57) ABSTRACT

Technologies for least recently used (LRU) cache replacement include a computing device with a processor with vector instruction support. The computing device retrieves a bucket of an associative cache from memory that includes multiple entries arranged from front to back. The bucket may be a 256-bit array including eight 32-bit entries. For lookups, a matching entry is located at a position in the bucket. The computing device executes a vector permutation processor instruction that moves the matching entry to the front of the bucket while preserving the order of other entries of the bucket. For insertion, an inserted entry is written at the back of the bucket. The computing device executes a vector permutation processor instruction that moves the inserted entry to the front of the bucket while preserving the order of other entries. The permuted bucket is stored to the memory. Other embodiments are described and claimed.

21 Claims, 7 Drawing Sheets

(51) Int. Cl.
*G06F 9/30* (2018.01)
*G06F 12/0871* (2016.01)

(56) References Cited

U.S. PATENT DOCUMENTS

| | | | | |
|---|---|---|---|---|
| 2005/0102465 A1* | 5/2005 | Royer | G06F 12/126 | |
| | | | | 711/1 |
| 2007/0234005 A1* | 10/2007 | Erlingsson | G06F 16/9014 | |
| | | | | 711/216 |
| 2010/0146213 A1* | 6/2010 | Yao | G06F 12/0802 | |
| | | | | 711/136 |
| 2014/0032569 A1* | 1/2014 | Kim | G06F 16/951 | |
| | | | | 707/747 |
| 2014/0310476 A1* | 10/2014 | Kruus | G06F 12/0871 | |
| | | | | 711/133 |
| 2015/0039626 A1* | 2/2015 | Sen | G06F 16/2456 | |
| | | | | 707/747 |
| 2016/0203082 A1* | 7/2016 | van Bemmel | G06F 12/0895 | |
| | | | | 711/128 |
| 2018/0113810 A1* | 4/2018 | Simionescu | G06F 3/0689 | |
| 2018/0248687 A1* | 8/2018 | Wassenberg | H04L 9/0643 | |
| 2019/0065403 A1* | 2/2019 | Zaydman | G06F 16/2255 | |
| 2019/0278849 A1* | 9/2019 | Chandramouli | G06F 9/526 | |

OTHER PUBLICATIONS

Hash Table, Wikipedia, The Free Encyclopedia, downloaded Oct. 1, 2018 (17 pages).
Cache Replacement Policies, Wikipedia, The Free Encyclopedia, downloaded Oct. 1, 2018 (9 pages).
Overview: Intrinsics for Intel® Advanced Vector Extensions 2 (Intel® AVX2) Instructions, Intel Developer Zone, Aug. 18, 2015, available at https://software.intel.com/en-us/node/523876 (3 pages).

* cited by examiner

```
void adjust_location(int location, bucket* bucket) {    ~212
    __m256i array = avx_load(bucket)
    __m256i permute_pattern = avx_load(permute_index[location])
    __m256i permuted_array = avx_permute(array, permute_pattern)
    avx_store (bucket, permuted_array)
}
```

TECHNOLOGIES FOR A LEAST RECENTLY USED CACHE REPLACEMENT POLICY USING VECTOR INSTRUCTIONS

BACKGROUND

Multi-way hash tables and other software cache structures are commonly used for many different computational workloads, including networking workloads, operating systems, and data centers. Certain caching systems use a least recently used (LRU) cache replacement policy, in which the least recently used item is evicted from the cache and replaced with a newer item. However, implementing a true LRU policy may be costly in hardware and/or software overhead. Certain hardware and/or software caches may instead implement a pseudo LRU policy or even a random replacement policy.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
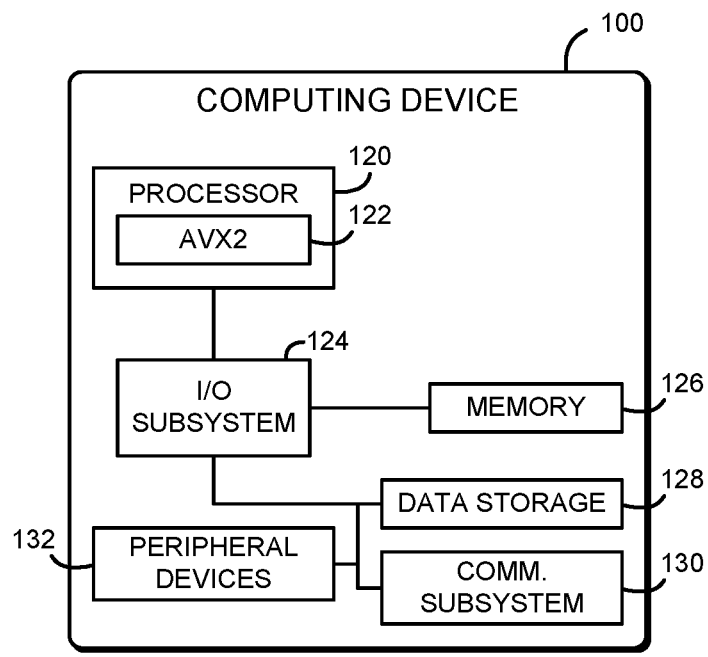
FIG. 1 is a simplified block diagram of at least one embodiment of a computing device for least recently used cache replacement with vector instructions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for least recently used cache replacement includes a processor 120 with vector instruction support 122, illustratively embodied as Intel® Advanced Vector Extensions 2 (Intel AVX2). In use, as described further below, during a cache lookup, when an item is found in the cache, the processor 120 moves the item to the front of its associated cache bucket using a vector permutation instruction that preserves the order of other items in the cache bucket. During a cache insertion, the new item is inserted at the back of the cache bucket, overwriting the least recently used (LRU) item in the bucket, and then the processor 120 moves the new item to the front of the cache bucket using a vector permutation instruction. Thus, the computing device 100 provides a true LRU cache replacement policy with improved performance compared to other software implementations. Accordingly, a computing device 100 in accordance with this disclosure may improve performance for flow lookups in a software virtual switch. As another example, a computing device 100 in accordance with this disclosure may improve data center performance by caching recently used data items so that future accesses to those items do not access a database node.

Figure 11:
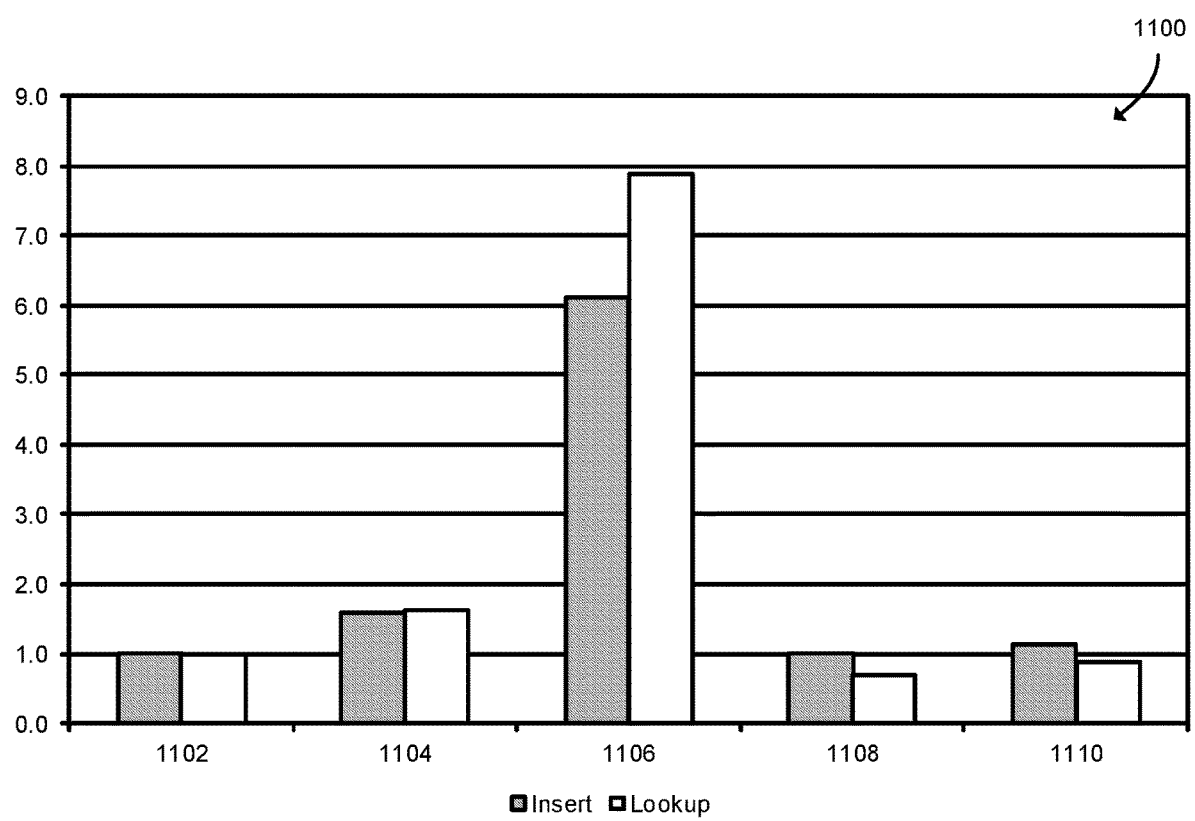
FIG. 11 is a graph illustrating experimental results that may be achieved by the computing device of FIGS. 1-2.

Referring now to FIG. 11, graph 1100 illustrates experimental results that may be achieved by one potential embodiment of the computing device 100. The graph 1100 illustrates insert and lookup performance for multiple software algorithms normalized against the performance of vector-based true LRU as described in this disclosure. Bars 1102 illustrate insert and lookup performance for the vector-based true LRU of this disclosure and are thus both equal to 1.0. Bars 1104 illustrate insert and lookup performance for an age-based true LRU algorithm and both equal about 1.6. Bars 1106 illustrate insert and lookup performance for a linked-list-based true LRU algorithm and equal about 6.1 and 7.9, respectively. Bars 1108 illustrate insert and lookup performance for bit-based pseudo-LRU and equal about 1.0 and 0.7, respectively. Bars 1110 illustrate insert and lookup performance for tree-based pseudo LRU and equal about 1.1 and 0.9, respectively. Thus, the performance of the computing device 100 of this disclosure for insertion and lookup operations is much faster than the other true LRU policies 1104, 1106. The performance of the computing device 100 for insertion and lookup operations may be somewhat slower than pseudo-LRU policies 1108, 1110, but those policies do not implement a true LRU policy. The true LRU policy of this disclosure may provide a higher cache hit ratio or otherwise improved caching performance as compared to pseudo-LRU policies 1108, 1110

Referring back to FIG. 1, the computing device 100 may be embodied as any type of computation or computer device capable of performing the functions described herein, including, without limitation, a computer, a server, a rack-based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively include the processor 120, an input/output subsystem 124, a memory 126, a data storage device 128, and a communication subsystem 130, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As described above, the processor 120 includes vector instruction support 122, which may be embodied as execution resources, instruction set support, and other hardware, firmware, and/or microcode resources for single-instruction multiple data (SIMD) operations. In particular, the vector instruction support 122 may include one or more processor instructions to perform permutation of multiple data items within a vector register or other data location. The vector instruction support 122 is illustratively embodied as Intel AVX2. In other embodiments, the vector instruction support 122 may be embodied as the NEON implementation of the Advanced SIMD extension for various ARM processor architectures provided by Arm Limited.

The memory 126 may be embodied as any type of volatile or non-volatile memory or data storage capable of performing the functions described herein. In operation, the memory 126 may store various data and software used during operation of the computing device 100, such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication subsystem 130 of the computing device 100 may be embodied as any network interface controller or other communication circuit, device, or collection thereof, capable of enabling communications between the computing device 100 and other remote devices over a network. The communication subsystem 130 may be configured to use any one or more communication technology (e.g., wired or wireless communications) and associated protocols (e.g., Ethernet, Infini-Band®, Bluetooth®, Wi-Fi®, WiMAX, etc.) to effect such communication.

As shown, the computing device 100 may also include one or more peripheral devices 132. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, microphone, network interface, and/or other input/output devices, interface devices, and/or peripheral devices.

Figure 2:
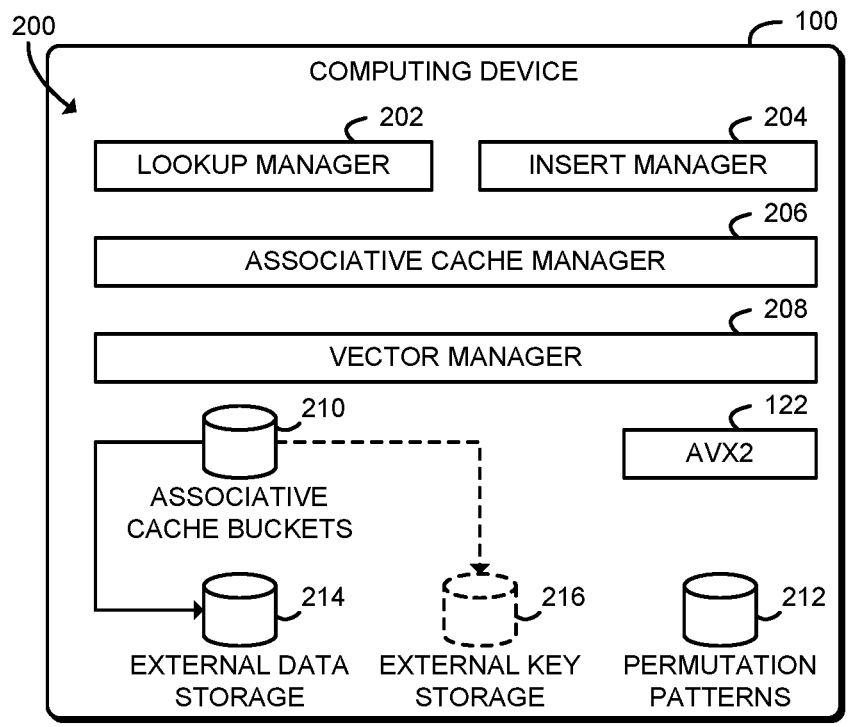
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a lookup manager 202, an insert manager 204, an associative cache manager 206, and a vector manager 208. The various components of the environment 200 may be embodied as hardware, firmware, software, or a combination thereof. As such, in some embodiments, one or more of the components of the environment 200 may be embodied as circuitry or collection of electrical devices (e.g., lookup manager circuitry 202, insert manager circuitry 204, associative cache manager circuitry 206, and/or vector manager circuitry 208). It should be appreciated that, in such embodiments, one or more of the lookup manager circuitry 202, the insert manager circuitry 204, the associative cache manager circuitry 206, and/or the vector manager circuitry 208 may form a portion of one or more of the processor 120 and/or other components of the computing device 100. Additionally, in some embodiments, one or more of the illustrative components may form a portion of another component and/or one or more of the illustrative components may be independent of one another.

The associative cache manager 206 is configured to generate a hash value as a function of a data item and retrieve an associative cache bucket 210 of an associative cache from the memory 126 as a function of the hash value. Each bucket 210 includes multiple entries arranged in an order from front to back. Each entry is sized to store a data item. In some embodiments, the bucket 210 may be embodied as a 256-bit array of eight entries, which each entry embodied as a 32-bit value. In some embodiments, retrieving the bucket 210 as a function of the hash value includes indexing a hash table in the memory 126 with the hash value. The associative cache manager 206 is further configured to store the bucket 210 in the memory 126 in response to moving an entry of the bucket 210 to the front of the bucket 210, as described further below. Additionally or alternatively, although illustrated as including a single associative cache, it should be understood that the techniques disclosed herein may be used in any level or levels of a multi-level cache hierarchy.

The lookup manager 202 is configured to identify a matching entry that includes a data item at a particular position within the bucket 210. The lookup manager 202 may be further configured to return a data value 214 associated with the matching item in response to identifying the matching entry of the bucket 210. In some embodiments, the data item may include a key for an external data item 214. In some embodiments, the data item may include a signature of an external key 216 of an external data item 214 and a signature mapping index, and returning the data item may include retrieving the external key 216 from the memory 126 using the signature mapping index.

The insert manager 204 is configured to store an inserted item at an entry of the bucket 210 located at the back of the bucket 210. In some embodiments, the entries of the bucket 210 may be partitioned into multiple regions, and the inserted item may be stored at an entry located at the back of a particular region of the bucket 210 associated with the inserted item. The insert manager 204 may be further configured to determine the region associated with the inserted item as a function of a priority level associated with the inserted item. As described above, in some embodiments, the inserted item may include a key for an external data item 214. In some embodiments, the inserted item may include a signature of an external key 216 and a signature mapping index.

The vector manager 208 is configured to execute a vector permutation processor instruction in response to identifying the matching entry and/or storing the inserted item. The vector permutation processor instruction may include an AVX2 instruction. The vector manager 208 is further configured to move, by the processor 120 (e.g., using the vector instruction support 122), the matching entry and/or the inserted entry of the bucket 210 to the front of the bucket 210 in response executing the vector permutation processor instruction. Moving the matching entry and/or the inserted entry includes preserving the order of other entries of the bucket 210. The vector permutation processor instruction may be executed with the bucket 210 and a predetermined permutation pattern 212. The vector manager 208 may be further configured to select the predetermined permutation pattern 212 from a plurality of predetermined permutation patterns 212 as a function of the position of the matching item and/or the inserted item in the bucket 210. In some embodiments, the entries of the bucket 210 may be partitioned into multiple regions, and the matching entry and/or the inserted entry may be moved to the front of a region of the bucket 210 that includes the matching entry and/or the inserted entry.

Figure 3:
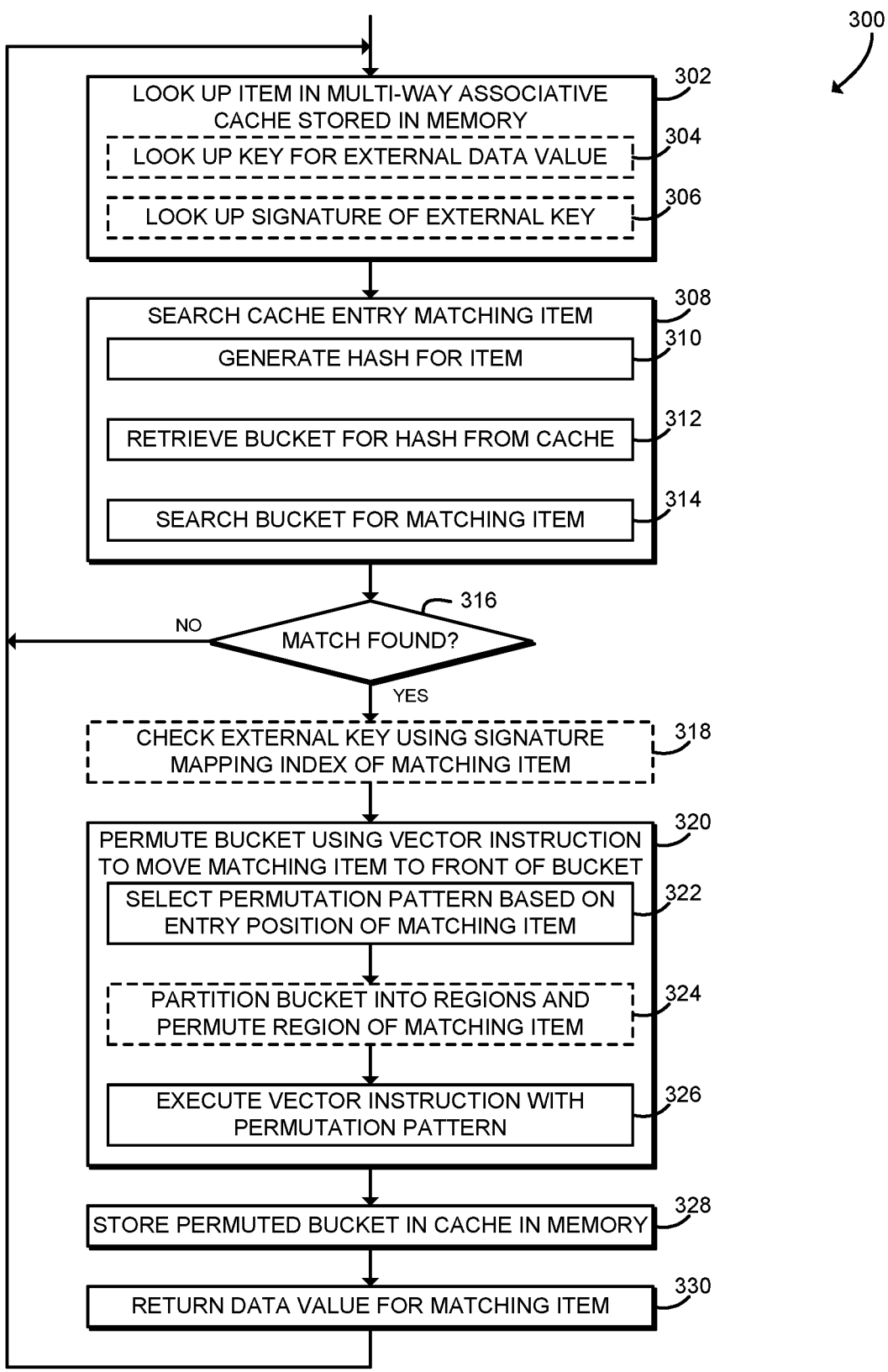
FIG. 3 is a simplified flow diagram of at least one embodiment of a method for cache lookup that may be performed by the computing device of FIGS. 1-2.

Referring now to FIG. 3, in use, the computing device 100 may execute a method 300 for cache lookup. It should be appreciated that, in some embodiments, the operations of the method 300 may be performed by one or more components of the environment 200 of the computing device 100 as shown in FIG. 2. The method 300 begins in block 302, in which the computing device 100 performs a lookup of an item in a multi-way associative cache stored in the memory 126. For example, the computing device 100 may look up a network flow in a flow cache as part of a data plane processing, for example in a virtual switch. Continuing that example, the cache lookup may be incorporated into an RTE table provided by a Data Plane Developer Kit (DPDK) or other software library for high-performance network processing. As another example, the computing device 100 may look up a web resource, file, object, or other cached data item that originated from a database node. The computing device 100 may look up the data item using a key or other identifier of the data item, such as one or more fields of a network header. In some embodiments, in block 304 the computing device 100 may look up a key for an external data item 214. In such embodiments, the key may be embodied as a 32-bit value or other value that may be small enough to fit within an associative cache bucket 210, as described further below. In some embodiments, in block 306 the computing device 100 may look up a signature of an external key 216 that is associated with the external data item 214. The signature may be embodied as a hash, a truncation, or another representation of the external key 216 that is smaller in size than the external key 216. For example, in some embodiments the external key 216 may be embodied as a 64-bit pointer, and the signature may be embodied as a 32-bit value, a 29-bit value, a 28-bit value, or other shorter value. As another example, in some embodiments the external key 216 may be embodied as one or more network packet headers, and the signature may be embodied as a 32-bit value, a 29-bit value, a 28-bit value, or other shorter value.

In block 308, the computing device 100 searches the cache for an item matching the item (e.g., the key or the signature of the key) that is being looked up. The computing device 100 may use any appropriate search technique. In block 310, the computing device 100 may generate a hash for the item. The hash may be generated using any appropriate hash function.

For example, the hash may be generated using a cryptographic hash function. As another example, the hash may be generated by extracting certain most-significant bits from the data item or its associated key (similar to selecting a cache line in a hardware cache). In block 312, the computing device 100 retrieves a bucket 210 for the hash value from the cache. For example, the computing device 100 may index a hash table or other in-memory data structure with the hash value and load the bucket 210 from that location. The bucket 210 may be embodied as an array, vector register, or other data structure that includes entries for multiple data items. The entries are arranged from front (e.g., index 0 of an array) to back (e.g., index n-1 of an n-element array). In some embodiments, the bucket 210 may be embodied as a 256-bit array that includes eight 32-bit entries. In block 314, the computing device 100 searches the bucket 210 for a matching item. For example, the computing device 100 may sequentially search each entry of the bucket 210 and determine whether that entry matches the item being looked up. As another example, the computing device 100 may search the bucket 210 in parallel using one or more SIMD instructions. If a matching item is found, the computing device 100 determines the location of the matching entry within the bucket 210, for example, the index of the matching 32-bit entry within a 256-bit array of eight 32-bit entries.

In block 316, the computing device 100 determines whether a match for the item was found in the cache. If not, the method 300 loops back to block 302, in which the computing device 100 may perform additional lookups. The computing device 100 may indicate that no match was found, for example by returning a null value or other indicator. If a matching item was found, the method 300 advances to block 318.

In some embodiments, in block 318, the computing device 100 may check an external key 216 using a signature mapping index of the matching item. As described above, in some embodiments the item that is looked up may be embodied as a signature of a larger key 216 that is stored externally from the cache. For example, the data item may be a 28-bit or 29-bit signature of an eight-byte pointer, a network packet header, or other external key 216. In those embodiments, part of each data item in the bucket 210 (e.g., three bits, two bits, or another part) is a signature mapping index. The signature mapping index may be used to identify the particular external key 216 that is associated with an entry in the bucket 210. The signature mapping index is permuted with the other parts of the item and thus may be used to track the external key 216 even when the data item has moved to a different position in the bucket 210. After locating the external key 216, the computing device 100 checks that the external key 216 matches the original lookup. If the external key 216 does not match (for example, due to a hash collision while generating the signature of the key 216), the computing device 100 may indicate that no match was found, for example by returning a null value or other indicator. If the external key 216 matches (or if no external keys 216 are in use), the method 300 advances to block 320.

In block 320, the computing device 100 permutes the bucket 210 using one or more vector instructions to move matching item to the front of the bucket 210. The relative order of the other items in the bucket 210 is preserved. The computing device 100 uses the vector instruction support 122 of the processor 120 to permute the bucket 210, which may provide improved performance and/or power efficiency. In block 322, the computing device 100 may select a permutation pattern 212 based on the entry position of the matching item. The selected permutation pattern 212 indicates that the entry containing the matching item is moved to the front of the bucket 210 and the relative order of the other entries is unchanged. The permutation pattern 212 may be selected from multiple, predetermined permutation patterns 212. For example, if the bucket 210 includes eight 32-bit entries, the permutation pattern 212 may be selected by indexing a predetermined array of eight patterns with the index of the matching item. Table 1, below, illustrates one potential embodiment of an array of predetermined permutation patterns that may be used for a bucket 210 with eight entries, indexed from one.

TABLE 1

Predetermined permutation patterns for eight-entry cache bucket.

| Index | Permutation Pattern |
|---|---|
| 1 | {1, 2, 3, 4, 5, 6, 7, 8} |
| 2 | {2, 1, 3, 4, 5, 6, 7, 8} |
| 3 | {3, 1, 2, 4, 5, 6, 7, 8} |
| 4 | {4, 1, 2, 3, 5, 6, 7, 8} |
| 5 | {5, 1, 2, 3, 4, 6, 7, 8} |
| 6 | {6, 1, 2, 3, 4, 5, 7, 8} |
| 7 | {7, 1, 2, 3, 4, 5, 6, 8} |
| 8 | {8, 1, 2, 3, 4, 5, 6, 7} |

In some embodiments, in block 324 the bucket 210 may be partitioned into multiple regions, and the computing device 100 may permute only the region including the matching item. In those embodiments, the matching item may be moved to the front of the region, which may not be the front of the bucket 210. Partitioning the bucket 210 may be useful, for example, to reduce interference between multiple network flows. For example, a partitioned bucket 210 may be used to provide guaranteed quality-of-service (QoS) for certain traffic classes (e.g., VoIP traffic, gaming traffic, etc.) or other network flows.

In block 326, the computing device 100 causes the processor 120 to execute a vector instruction with the permutation pattern 212. The processor 120 moves the entry of the matching item to the front of the bucket 210 (and/or the front of a particular region of the bucket 210) while preserving the relative order of the other entries of the bucket 210. As described above, the vector instruction may be embodied as an AVX2 permutation instruction.

After permuting the bucket 210, in block 328 the computing device 100 stores the permuted bucket 210 back to the cache in the memory 126. Thus, after being stored, the matching item (e.g., the matching key or matching signature of the key) has been moved to the front of the bucket 210 (or region of the bucket 210) and the other items have been moved closer to the back of the bucket 210, with their relative ordering preserved. Thus, as described further below, the cache may support a least recently used (LRU) replacement policy.

In block 330, the computing device 100 returns a data value 214 associated with the matching item from the cache. As described above, the computing device 100 may return a cached network flow, which may be used for data plane processing. For example, the cached network flow may be associated with an action such as forward, drop, encapsulate, de-encapsulate, or other data plane processing action. As another example, the computing device 100 may return a cached web resource, file, or other data object. After returning the item, the method 300 loops back to block 302 to perform additional lookups.

Figure 4:
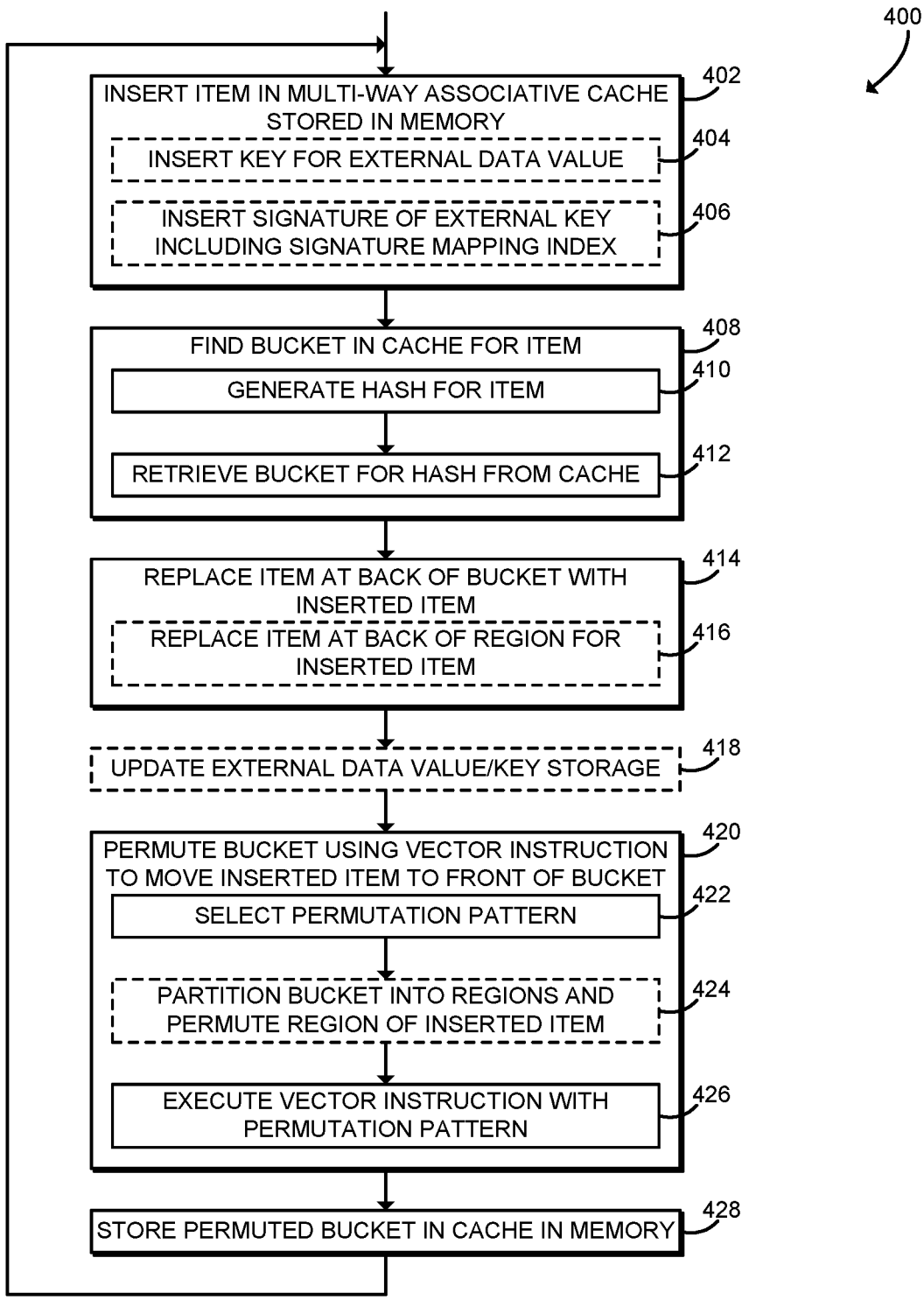
FIG. 4 is a simplified flow diagram of at least one embodiment of a method for cache insertion that may be performed by the computing device of FIGS. 1-2.

Referring now to FIG. 4, in use, the computing device 100 may execute a method 400 for cache insertion. It should be appreciated that, in some embodiments, the operations of the method 400 may be performed by one or more components of the environment 200 of the computing device 100 as shown in FIG. 2. The method 400 begins in block 402, in which the computing device 100 inserts an item in a multi-way associative cache stored in the memory 126. For example, as described above, the computing device 100 may store a network flow in a flow cache as part of data plane processing, for example in a virtual switch. As another example, the computing device 100 may look up a web resource, file, object, or other cached data item that originated from a database node. The computing device 100 may insert the data item with a key or other identifier of the data item. In some embodiments, in block 404 the computing device 100 may insert a key for an external data item 214. In such embodiments, the key may be embodied as a 32-bit value or other value that may be small enough to fit within an associative cache bucket 210, as described further below. In some embodiments, in block 406, the computing device 100 may insert a signature of an external key 216 that is associated with the external data item 214. The computing device 100 also inserts a signature mapping index with the signature. As described above, the signature may be embodied as a hash, a truncation, or another representation of the external key 216 that is smaller in size than the external key 216. For example, in some embodiments the external key 216 may be embodied as a 64-bit pointer, and the signature may be embodied as a 32-bit value, a 29-bit value, a 28-bit value, or other shorter value. As another example, in some embodiments the external key 216 may be embodied as one or more network packet headers, and the signature may be embodied as a 32-bit value, a 29-bit value, a 28-bit value, or other shorter value. The signature mapping index may be embodied as a 3-bit value, a 2-bit value, or other index used to identify the particular external key 216 in the external key storage 216 that is associated with the inserted item. As described above, the signature mapping index may be used to identify the external key 216 independent of the position of the signature within the cache bucket 210.

In block 408, the computing device 100 finds a bucket 210 in the associative cache in which to store the inserted data item (e.g., the inserted key or signature of the key). The computing device 100 may use any appropriate search or hashing algorithm to find the bucket 210. In block 410, the computing device 100 may generate a hash for the inserted item. The hash may be generated using any appropriate hashing algorithm. For example, as described above, the hash may be generated using a cryptographic hash algorithm. As another example, the hash may be generated by extracting certain most-significant bits from the data item or its associated key (similar to selecting a cache line in a hardware cache). In block 412, the computing device 100 retrieves a bucket 210 for the hash value from the cache. For example, the computing device 100 may index a hash table or other in-memory data structure with the hash value and load the bucket 210 from that location. As described above, the bucket 210 may be embodied as an array or other data structure that includes entries for multiple data items. The entries are arranged from front (e.g., index 0 of an array) to back (e.g., index n-1 of an n-element array). In some embodiments, the bucket 210 may be embodied as a 256-bit array that includes eight 32-bit entries.

In block 414, the computing device 100 replaces the entry at the back of the bucket 210 with the inserted item (e.g., the inserted key or signature of the key). For example, the computing device 100 may write the inserted item to the index n-1 of an n-element array. As described above in connection with FIG. 3, as items are accessed in the bucket 210 they are moved to the front of the bucket, with the relative ordering of the remaining entries preserved. Thus, the entry at the back of the bucket 210 is the least-recently used item in the bucket 210. Accordingly, by inserting the item at the back of the bucket 210, the computing device 100 implements a true LRU replacement policy. In some embodiments, in block 416, the bucket 210 may be partitioned into multiple regions, and the computing device 100 may replace the entry at the back of a particular region, which may not be at the back of the bucket 210. The region of the bucket 210 may be selected, for example, based on a priority of the inserted item or other attribute of the inserted item. As described above, partitioning the bucket 210 may be useful, for example, to reduce interference between multiple network flows.

In some embodiments, in block 418, the computing device 100 may update an external data storage 214 and/or external key storage 216 based on in the inserted item. For example, the computing device 100 may update the external data storage 214 with the data value associated with the inserted item, such as the cached network flow, cached web resource, file, or other object. As another example, when the signature of a key has been inserted at the back of the bucket 210, the computing device 100 may update the external key storage 216 with the key 216 associated with that signature. The computing device 100 may ensure that the key mapping index stored in the bucket 210 is associated with the correct external key 216.

In block 420, the computing device permutes the bucket 210 using one or more vector instructions to move matching item to the front of the bucket 210. The relative order of the other items in the bucket 210 is preserved. The computing device 100 uses the vector instruction support 122 of the processor 120 to permute the bucket 210, which may provide improved performance and/or power efficiency. In block 422, the computing device 100 may select a permutation pattern 212. The permutation pattern 212 may be a predetermined pattern that moves the entry at the back of the bucket 210 to the front of the bucket 210 and preserves the order of the other entries. For example, for a bucket 210 with eight entries, the permutation pattern 212 may be a vector with values {8, 1, 2, 3, 4, 5, 6, 7}. In some embodiments, in block 424 the bucket 210 may be partitioned into multiple regions, and the computing device 100 may permute only the region associated with the inserted item. In those embodiments, the inserted item may be moved to the front of the associated region, and not the front of the bucket 210. As described above, the region may be selected based on a priority of the inserted item. For example, a high-priority traffic flow (e.g., VoIP traffic, gaming traffic, etc.) may be associated with the entire bucket 210 and thus moved to the front of the bucket 210, while a lower-priority traffic flow (e.g., large file data transfer) may be associated with a region of the bucket 210 and moved to the front of that region (and not the front of the bucket 210).

In block 426, the computing device 100 causes the processor 120 to execute a vector instruction with the permutation pattern 212. The processor 120 moves the entry of the matching item to the front of the bucket 210 (and/or the front of a particular region of the bucket 210) while preserving the relative order of the other entries of the bucket 210. As described above, the vector instruction may be embodied as an AVX2 permutation instruction.

After permuting the bucket 210, in block 428 the computing device 100 stores the permuted bucket 210 back to the cache in the memory 126. Thus, after being stored, the inserted item has been moved to the front of the bucket 210 (or region of the bucket 210) and the other items have been moved closer to the back of the bucket 210, with their relative ordering preserved. As described above in connection with FIG. 3, the inserted item may be looked up in subsequent cache lookups. After inserting the item, the method 400 loops back to block 402 to insert additional items in the cache.

Figure 5:
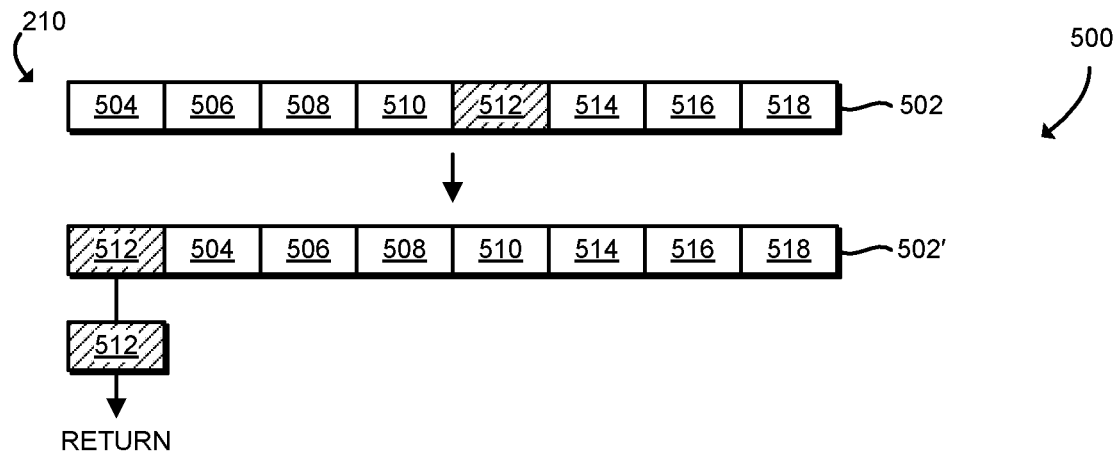
FIG. 5 is a schematic diagram illustrating a cache lookup performed according to the method of FIG. 3.

Referring now to FIG. 5, diagram 500 illustrates a cache lookup that may be performed by the computing device 100. The diagram 500 shows a cache bucket 502 that has been retrieved from the memory 126. The cache bucket 502 illustratively includes eight entries 504, 506, 508, 510, 512, 514, 516, 518. Illustratively, the cache bucket 502 may be embodied as a 256-bit array, and each of those entries may be embodied as a 32-bit value. Illustratively, the entry 512 matches the item being looked up. The diagram 500 further illustrates the cache bucket 502' after permutation. As shown, the entry 512 has been moved to the front of the bucket 502', and the order of the remaining entries 504, 506, 508, 510, 514, 516, 518 has been preserved. As shown, a data value associated with the entry 512 may be returned from the lookup operation.

Figure 6:
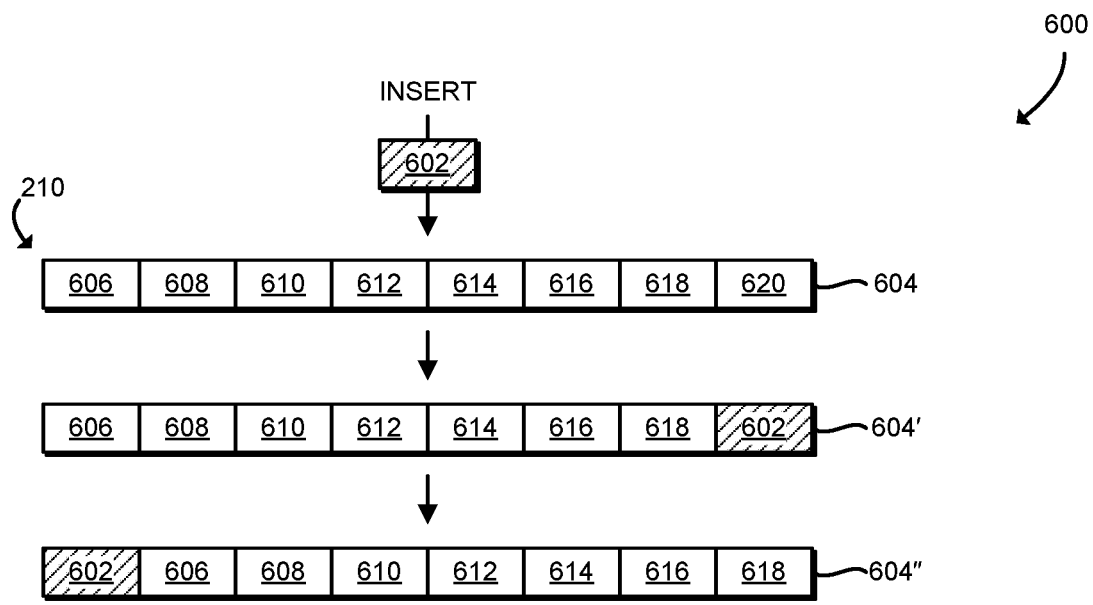
FIG. 6 is a schematic diagram illustrating a cache insertion performed according to the method of FIG. 4.

Referring now to FIG. 6, diagram 600 illustrates a cache insertion that may be performed by the computing device 100. The diagram 600 shows an item 602 that is inserted into the cache. The diagram 600 shows a cache bucket 604 that has been retrieved from the memory 126. The cache bucket 604 illustratively includes eight entries 606, 608, 610, 612, 614, 616, 618, 620. Illustratively, the cache bucket 604 may be embodied as a 256-bit array, and each of those entries may be embodied as a 32-bit value. As shown, the inserted item 602 is inserted into the cache bucket 604' at the back of the cache bucket 604' and overwrites the entry 620, which was previously at the back of the bucket 604'. The diagram 600 further illustrates the cache bucket 604" after permutation. As shown, the entry 602 has been moved to the front of the bucket 604", and the order of the remaining entries 606, 608, 610, 612, 614, 616, 618 has been preserved.

Figure 7:
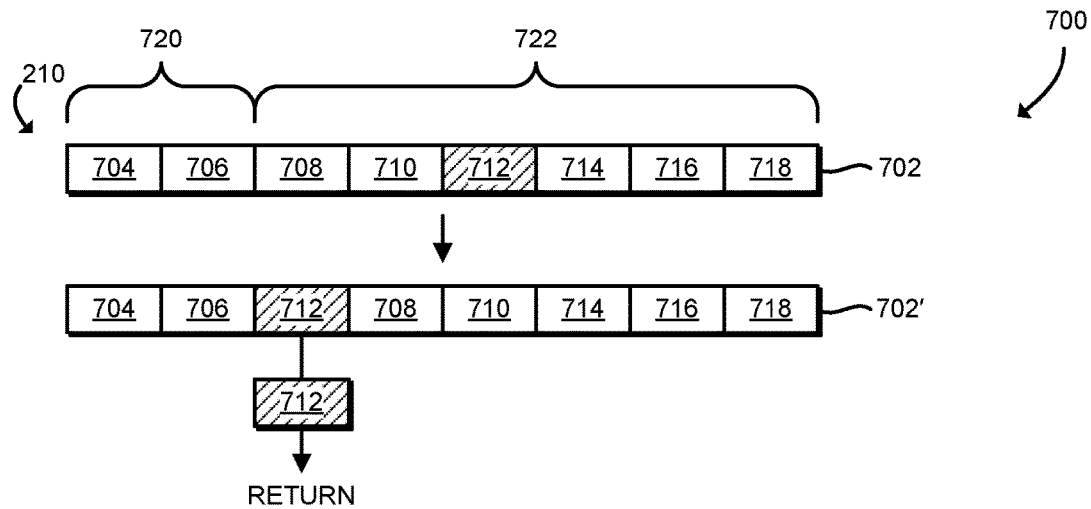
FIG. 7 is a schematic diagram illustrating a cache lookup with partitioned cache regions performed according to the method of FIG. 3.

Referring now to FIG. 7, diagram 700 illustrates another cache lookup that may be performed by the computing device 100. The diagram 700 shows a cache bucket 702 that has been retrieved from the memory 126. The cache bucket 702 illustratively includes eight entries 704, 706, 708, 710, 712, 714, 716, 718. Illustratively, the cache bucket 702 may be embodied as a 256-bit array, and each of those entries may be embodied as a 32-bit value. Additionally, the cache bucket 702 is partitioned into two regions 720, 722. The region 720 includes the entries 704, 706, and the region 722 includes the entries 708, 710, 712, 714, 716, 718. Illustratively, the entry 712 matches the item being looked up. The diagram 700 further illustrates the cache bucket 702' after permutation. As shown, the entry 712 has been moved to the front of the region 722 of the bucket 702', and the order of the remaining entries 704, 706, 708, 710, 714, 716, 718 has been preserved. Illustratively, the partitioned bucket 702 may be permuted using an array of predetermined permutation patterns 212 as illustratively shown in Table 2, below. As shown in FIG. 7, a data value associated with the entry 712 may be returned from the lookup operation.

TABLE 2

Predetermined permutation patterns for partitioned eight-entry cache bucket.

| Index | Permutation Pattern |
| --- | --- |
| 1 | {1, 2, 3, 4, 5, 6, 7, 8} |
| 2 | {2, 1, 3, 4, 5, 6, 7, 8} |
| 3 | {1, 2, 3, 4, 5, 6, 7, 8} |
| 4 | {1, 2, 4, 3, 5, 6, 7, 8} |
| 5 | {1, 2, 5, 3, 4, 6, 7, 8} |
| 6 | {1, 2, 6, 3, 4, 5, 7, 8} |
| 7 | {1, 2, 7, 3, 4, 5, 6, 8} |
| 8 | {1, 2, 8, 3, 4, 5, 6, 7} |

Figure 8:
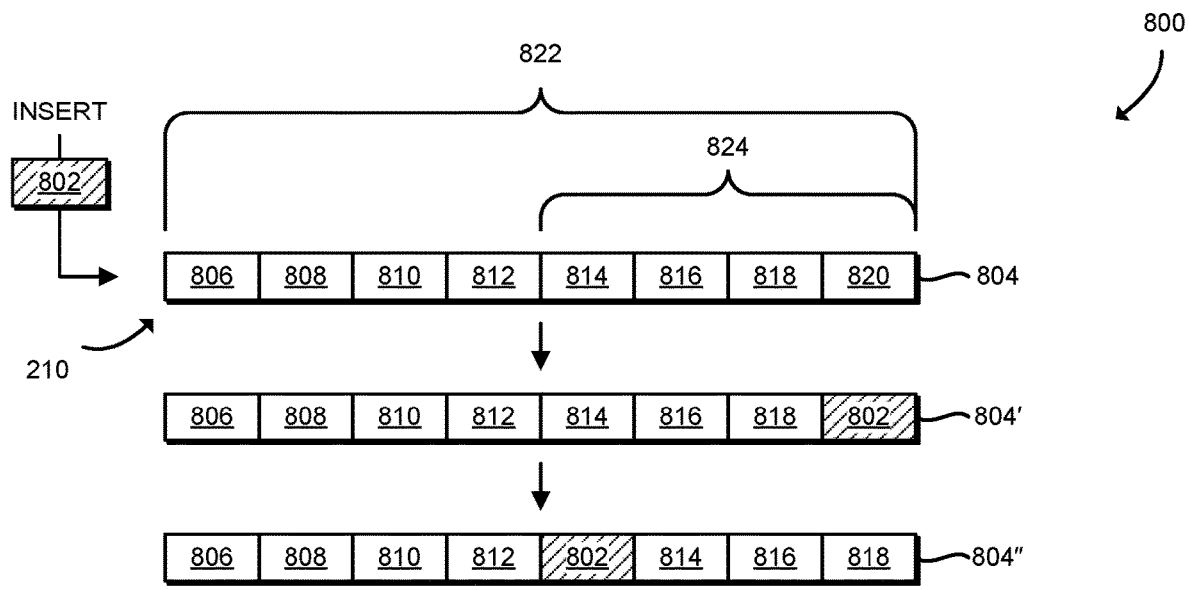
FIG. 8 is a schematic diagram illustrating a cache insertion with priority cache regions performed according to the method of FIG. 4.

Referring now to FIG. 8, diagram 800 illustrates another cache insertion that may be performed by the computing device 100. The diagram 800 shows an item 802 that is inserted into the cache. The diagram 800 shows a cache bucket 804 that has been retrieved from the memory 126. The cache bucket 804 illustratively includes eight entries 806, 808, 810, 812, 814, 816, 818, 820. Illustratively, the cache bucket 604 may be embodied as a 256-bit array, and each of those entries may be embodied as a 32-bit value. Additionally, the cache bucket 804 is partitioned into two overlapping regions 822, 824. The region 822 includes the entire bucket 804, and the region 824 includes the entries 814, 816, 818, 820. As shown, the inserted item 802 is inserted into the cache bucket 804' at the back of the cache bucket 804' and overwrites the entry 820, which was previously at the back of the bucket 804'. The diagram 600 further illustrates the cache bucket 804" after permutation. As shown, the entry 802 has been moved to the front of the region 824 of the bucket 804", and the order of the remaining entries 806, 808, 810, 812, 814, 816, 818 has been preserved. For example, in some embodiments, the item 802 may be a lower-priority traffic flow associated with the region 824. In those embodiments, higher-priority flows may be associated with the region 822 and thus may be more likely to be retained in the cache.

Figures 9, 10:
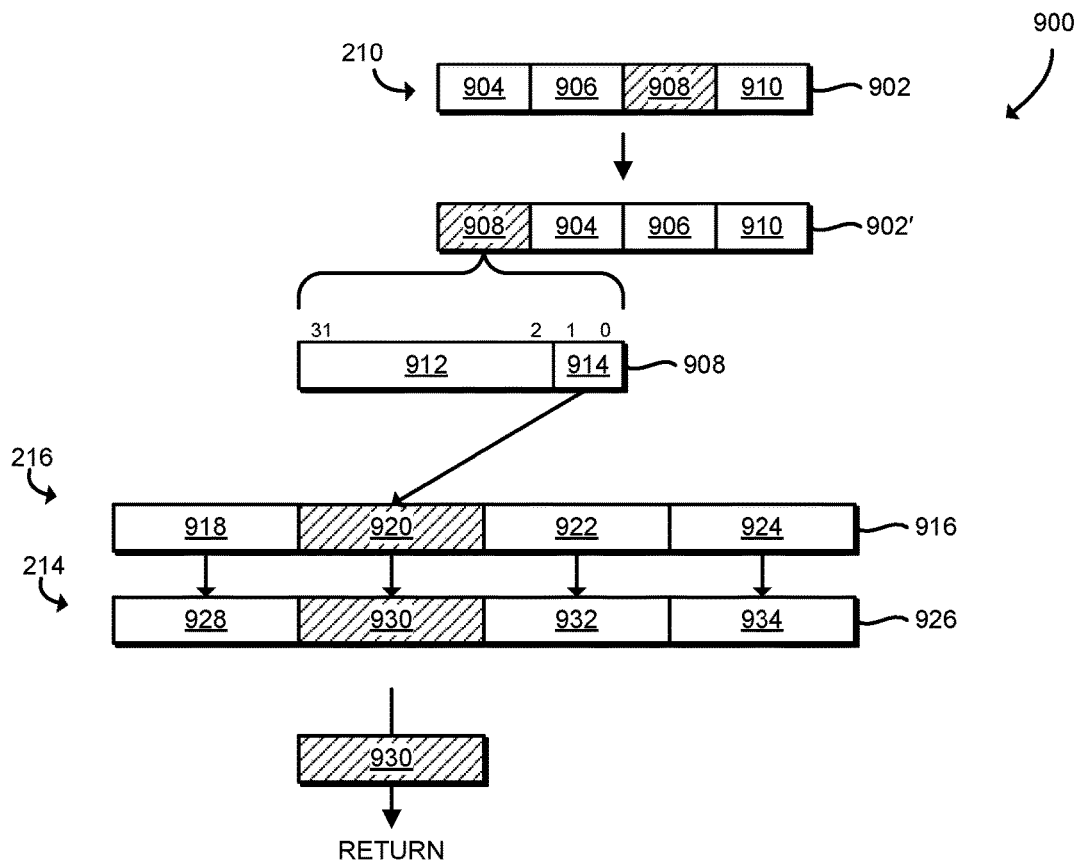
FIG. 9 is a schematic diagram illustrating a cache lookup with external data performed according to the method of FIG. 3.
FIG. 10 is a pseudocode diagram illustrating a method for permuting a cache bucket that may be executed by the computing device of FIGS. 1-2.

Referring now to FIG. 9, diagram 900 illustrates another cache lookup that may be performed by the computing device 100. The diagram 900 shows a cache bucket 902 that has been retrieved from the memory 126. The cache bucket 902 illustratively includes four entries 904, 906, 908, 910. Illustratively, the cache bucket 902 may be embodied as a 128-bit array, and each of those entries may be embodied as a 32-bit value. Illustratively, the entry 908 matches the item being looked up. The diagram 900 further illustrates the cache bucket 902' after permutation. As shown, the entry 908 has been moved to the front of the bucket 902', and the order of the remaining entries 904, 906, 910 has been preserved. The entry 908 is a 32-bit value. Illustratively, the two least-significant bits of the entry 908 are a signature mapping index 914, and the remaining most significant bits of the entry 908 are a signature 912. External key storage 916 is shown, which includes external keys 918, 920, 922, 924. Each of the external keys may be embodied as a 64-bit pointer or other data item. External data 926 is shown, which includes external data values 928, 930, 932, 934. Each of the external keys 918, 920, 922, 924 is associated with a corresponding external data value 928, 930, 932, 934. The signature mapping index 914 may be used to locate the external key 920 that corresponds to the entry 908 within the external data 916. Because the signature mapping index 914 is permuted with the signature 912, the external key 920 may be located regardless of the position of the entry 908 within the cache bucket 902. As shown, the external data item 930 associated with the external key 920 may be returned from the lookup operation. Additionally or alternatively, although illustrated as separate external key storage 916 and external data 926, in some embodiments those may be combined. For example, one or more network packet headers used as external keys may be stored together with an associated action pointer.

Referring now to FIG. 10, pseudocode 1000 illustrates a function adjust_location for permuting a cache bucket that may be executed by the computing device 100. The function of FIG. 10 may be executed, for example, when permuting a cache bucket after looking up an item as discussed above in connection with FIG. 3 or when permuting a cache bucket after inserting an item as discussed above in connection with FIG. 4. The function adjust_location is passed parameters that identify a cache bucket 210 and a position of a matching entry within the bucket 210. As shown, the cache bucket 210 is loaded from the memory 126 with an avx_load function, which may execute one or more intrinsic functions, assembly routines, or otherwise invoke a vector instruction of the AVX2 support 122 of the processor 120 to load the cache bucket into a 256-bit array (e.g., into a vector register of the processor 120). Next, a permutation pattern 212 is selected from permute_index, which is a table of predetermined permutation patterns 212. For example, permute_index may include data similar to Table 1 or, for partitioned cache buckets, Table 2, above. The permutation pattern 212 is also loaded with the avx_load function. Next, the function invokes the avx permute function to permute the bucket 210 with the permutation pattern 212. The avx_permute function may invoke an intrinsic function such as _mm256_permutevar8x32_ps or otherwise invoke a vector instruction of the AVX2 support 122 of the processor 120 to permute the cache bucket. Next, the function invokes the avx_store function to store the permuted array into the memory 126 (i.e., store the permuted bucket 210 back into the cache). Accordingly, the illustrative function adjust_location performs true LRU cache replacement using just four vector AVX instructions, and may be much faster to execute as compared to other LRU implementations (e.g., age-based or linked-list implementations).

It should be appreciated that, in some embodiments, the methods 300 and/or 400 may be embodied as various instructions stored on a computer-readable media, which may be executed by the processor 120, the I/O subsystem 124, and/or other components of the computing device 100 to cause the computing device 100 to perform the respective method 300 and/or 400. The computer-readable media may be embodied as any type of media capable of being read by the computing device 100 including, but not limited to, the memory 126, the data storage device 128, firmware devices, and/or other media.

EXAMPLES

Illustrative examples of the technologies disclosed herein are provided below. An embodiment of the technologies may include any one or more, and any combination of, the examples described below.

Example 1 includes a computing device for least recently used cache replacement, the computing device comprising: a processor; a memory; an associative cache manager to (i) generate a hash value as a function of a first item and (ii) retrieve a bucket of an associative cache from the memory as a function of the hash value, wherein the bucket includes a plurality of entries arranged in an order from a front to a back, and wherein each entry is sized to store an item; a lookup manager to identify a first entry of the bucket that includes the first item, wherein the first entry is at a position in the bucket; and a vector manager to (i) execute a vector permutation processor instruction in response to identification of the first entry, and (ii) move, by the processor, the first entry of the bucket to the front of the bucket in response to execution of the vector permutation processor instruction, wherein to move the first entry comprises to preserve the order of other entries of the bucket; wherein the associative cache manager is further to store the bucket in the memory of the computing device in response to movement of the first entry of the bucket to the front of the bucket.

Example 2 includes the subject matter of Example 1, and wherein: the bucket comprises a 256-bit array of eight entries, wherein each entry comprises a 32-bit value; and the vector permutation processor instruction comprises an AVX2 instruction.

Example 3 includes the subject matter of any of Examples 1 and 2, and wherein to execute the vector permutation processor instruction comprises to execute the vector permutation processor instruction with the bucket and a predetermined permutation pattern.

Example 4 includes the subject matter of any of Examples 1-3, and wherein the vector manager is further to select the predetermined permutation pattern from a plurality of predetermined permutation patterns as a function of the position of the first item in the bucket.

Example 5 includes the subject matter of any of Examples 1-4, and wherein: the entries of the bucket are partitioned into a plurality of regions; and to move the first entry of the bucket to the front of the bucket comprises to move the first entry to a front of a first region of the bucket, wherein the first region includes the first entry.

Example 6 includes the subject matter of any of Examples 1-5, and wherein the lookup manager is further to return a first data value associated with the first item in response to identification of the first entry of the bucket.

Example 7 includes the subject matter of any of Examples 1-6, and wherein: the first item comprises a signature of an external key and a signature mapping index; the first data value is associated with the external key; and to return the first data value comprises to retrieve the external key from the memory with the signature mapping index of the first item and to return the first data value.

Example 8 includes the subject matter of any of Examples 1-7, and wherein to retrieve the bucket of the associative cache from the memory as a function of the hash value comprises to index a hash table with the hash value.

Example 9 includes a method for least recently used cache replacement, the method comprising: generating, by a computing device a hash value as a function of a first item; retrieving, by the computing device, a bucket of an associative cache from a memory of the computing device as a function of the hash value, wherein the bucket includes a plurality of entries, and wherein each entry is sized to store an item; identifying, by the computing device, a first entry of the bucket that includes the first item, wherein the first entry is at a position in the bucket; executing, by the computing device, a vector permutation processor instruction in response to identifying the first entry; move, by a processor of the computing device, the first entry of the bucket to the front of the bucket in response to executing the vector permutation processor instruction, wherein moving the first entry comprises preserving an order of other entries of the bucket; and storing, by the computing device, the bucket in the memory of the computing device in response to moving the first entry of the bucket to the front of the bucket.

Example 10 includes the subject matter of Example 9, and wherein: the bucket comprises a 256-bit array of eight entries, wherein each entry comprises a 32-bit value; and the vector permutation processor instruction comprises an AVX2 instruction.

Example 11 includes the subject matter of any of Examples 9 and 10, and wherein executing the vector permutation processor instruction comprises executing the vector permutation processor instruction with the bucket and a predetermined permutation pattern.

Example 12 includes the subject matter of any of Examples 9-11, and further comprising selecting, by the computing device, the predetermined permutation pattern from a plurality of predetermined permutation patterns as a function of the position of the first item in the bucket.

Example 13 includes the subject matter of any of Examples 9-12, and wherein: the entries of the bucket are partitioned into a plurality of regions; and moving the first entry of the bucket to the front of the bucket comprises moving the first entry to a front of a first region of the bucket, wherein the first region includes the first entry.

Example 14 includes the subject matter of any of Examples 9-13, and further comprising returning, by the computing device, a first data value associated with the first item in response to identifying the first entry of the bucket.

Example 15 includes the subject matter of any of Examples 9-14, and wherein: the first item comprises a signature of an external key and a signature mapping index; the first data value is associated with the external key; and returning the first data value comprises retrieving the external key from the memory with the signature mapping index of the first item and returning the first data value.

Example 16 includes the subject matter of any of Examples 9-15, and wherein retrieving the bucket of the associative cache from the memory as a function of the hash value comprises indexing a hash table with the hash value.

Example 17 includes one or more computer-readable storage media comprising a plurality of instructions stored thereon that, in response to being executed, cause a computing device to: generate a hash value as a function of a first item; retrieve a bucket of an associative cache from a memory of the computing device as a function of the hash value, wherein the bucket includes a plurality of entries, and wherein each entry is sized to store an item; identify a first entry of the bucket that includes the first item, wherein the first entry is at a position in the bucket; execute a vector permutation processor instruction in response to identifying the first entry; move, by a processor of the computing device, the first entry of the bucket to the front of the bucket in response to executing the vector permutation processor instruction, wherein to move the first entry comprises to preserve an order of other entries of the bucket; and store the bucket in the memory of the computing device in response to moving the first entry of the bucket to the front of the bucket.

Example 18 includes the subject matter of Example 17, and wherein: the bucket comprises a 256-bit array of eight entries, wherein each entry comprises a 32-bit value; and the vector permutation processor instruction comprises an AVX2 instruction.

Example 19 includes the subject matter of any of Examples 17 and 18, and wherein to execute the vector permutation processor instruction comprises to execute the vector permutation processor instruction with the bucket and a predetermined permutation pattern.

Example 20 includes the subject matter of any of Examples 17-19, and further comprising a plurality of instructions stored thereon that, in response to being executed, cause the computing device to select the predetermined permutation pattern from a plurality of predetermined permutation patterns as a function of the position of the first item in the bucket.

Example 21 includes the subject matter of any of Examples 17-20, and wherein: the entries of the bucket are partitioned into a plurality of regions; and to move the first entry of the bucket to the front of the bucket comprises to move the first entry to a front of a first region of the bucket, wherein the first region includes the first entry.

Example 22 includes the subject matter of any of Examples 17-21, and further comprising a plurality of instructions stored thereon that, in response to being executed, cause the computing device to return a first data value associated with the first item in response to identifying the first entry of the bucket.

Example 23 includes the subject matter of any of Examples 17-22, and wherein: the first item comprises a signature of an external key and a signature mapping index; the first data value is associated with the external key; and to return the first data value comprises to retrieve the external key from the memory with the signature mapping index of the first item and to return the first data value.

Example 24 includes the subject matter of any of Examples 17-23, and wherein to retrieve the bucket of the associative cache from the memory as a function of the hash value comprises to index a hash table with the hash value.

Example 25 includes a computing device for least recently used cache replacement, the computing device comprising: a processor; a memory; an associative cache manager to (i) generate a hash value as a function of a first item and (ii) retrieve a bucket of an associative cache from the memory as a function of the hash value, wherein the bucket includes a plurality of entries arranged in an order from a front to a back, and wherein each entry is sized to store an item; an insert manager to store the first item at a first entry of the bucket, wherein the first entry is at the back of the bucket; and a vector manager to (i) execute a vector permutation processor instruction in response to storage of the first item and (ii) move, by the processor, the first entry of the bucket to the front of the bucket in response to execution of the vector permutation processor instruction, wherein to move the first entry comprises to preserve the order of other entries of the bucket; and wherein the associative cache manager is further to store the bucket in the memory of the computing device in response to movement of the first entry of the bucket to the front of the bucket.

Example 26 includes the subject matter of Example 25, and wherein: the bucket comprises a 256-bit array of eight entries, wherein each entry comprises a 32-bit value; and the vector permutation processor instruction comprises an AVX2 instruction.

Example 27 includes the subject matter of any of Examples 25 and 26, and wherein to execute the vector permutation processor instruction comprises to execute the vector permutation processor instruction with the bucket and a predetermined permutation pattern.

Example 28 includes the subject matter of any of Examples 25-27, and wherein: the entries of the bucket are partitioned into a plurality of regions; and to move the first entry of the bucket to the front of the bucket comprises to move the first entry to a front of a first region associated with the first item.

Example 29 includes the subject matter of any of Examples 25-28, and wherein to store the first item at the first entry of the bucket comprises to store the first item at the first entry, wherein the first entry is at a back of the first region of the bucket.

Example 30 includes the subject matter of any of Examples 25-29, and wherein the insert manager is further to determine the first region associated with the first item as a function of a priority level associated with the first item.

Example 31 includes the subject matter of any of Examples 25-30, and wherein the first item comprises a signature of an external key and a signature mapping index.

Example 32 includes the subject matter of any of Examples 25-31, and wherein to retrieve the bucket of the associative cache from the memory as a function of the hash value comprises to index a hash table with the hash value.

Example 33 includes a method for least recently used cache replacement, the method comprising: generating, by a computing device, a hash value as a function of a first item; retrieving, by the computing device, a bucket of an associative cache from a memory of the computing device as a function of the hash value, wherein the bucket includes a plurality of entries arranged in an order from a front to a back, and wherein each entry is sized to store an item; storing, by the computing device, the first item at a first entry of the bucket, wherein the first entry is at the back of the bucket; executing, by the computing device, a vector permutation processor instruction in response to storing the first item; moving, by a processor of the computing device, the first entry of the bucket to the front of the bucket in response to executing the vector permutation processor instruction, wherein to move the first entry comprises to preserve the order of other entries of the bucket; and storing, by the computing device, the bucket in the memory of the computing device in response to moving the first entry of the bucket to the front of the bucket.

Example 34 includes the subject matter of Example 33, and wherein: the bucket comprises a 256-bit array of eight entries, wherein each entry comprises a 32-bit value; and the vector permutation processor instruction comprises an AVX2 instruction.

Example 35 includes the subject matter of any of Examples 33 and 34, and wherein executing the vector permutation processor instruction comprises executing the vector permutation processor instruction with the bucket and a predetermined permutation pattern.

Example 36 includes the subject matter of any of Examples 33-35, and wherein: the entries of the bucket are partitioned into a plurality of regions; and moving the first entry of the bucket to the front of the bucket comprises moving the first entry to a front of a first region associated with the first item.

Example 37 includes the subject matter of any of Examples 33-36, and wherein storing the first item at the first entry of the bucket comprises storing the first item at the first entry, wherein the first entry is at a back of the first region of the bucket.

Example 38 includes the subject matter of any of Examples 33-37, and further comprising determining, by the computing device, the first region associated with the first item as a function of a priority level associated with the first item.

Example 39 includes the subject matter of any of Examples 33-38, and wherein the first item comprises a signature of an external key and a signature mapping index.

Example 40 includes the subject matter of any of Examples 33-39, and wherein retrieving the bucket of the associative cache from the memory as a function of the hash value comprises indexing a hash table with the hash value.

Example 41 includes one or more computer-readable storage media comprising a plurality of instructions stored thereon that, in response to being executed, cause a computing device to: generate a hash value as a function of a first item; retrieve a bucket of an associative cache from a memory of the computing device as a function of the hash value, wherein the bucket includes a plurality of entries arranged in an order from a front to a back, and wherein each entry is sized to store an item; store the first item at a first entry of the bucket, wherein the first entry is at the back of the bucket; execute a vector permutation processor instruction in response to storing the first item; move, by a processor of the computing device, the first entry of the bucket to the front of the bucket in response to executing the vector permutation processor instruction, wherein to move the first entry comprises to preserve the order of other entries of the bucket; and store, by the computing device, the bucket in the memory of the computing device in response to moving the first entry of the bucket to the front of the bucket.

Example 42 includes the subject matter of Example 41, and wherein: the bucket comprises a 256-bit array of eight entries, wherein each entry comprises a 32-bit value; and the vector permutation processor instruction comprises an AVX2 instruction.

Example 43 includes the subject matter of any of Examples 41 and 42, wherein to execute the vector permutation processor instruction comprises to execute the vector permutation processor instruction with the bucket and a predetermined permutation pattern.

Example 44 includes the subject matter of any of Examples 41-43, and wherein: the entries of the bucket are partitioned into a plurality of regions; and to move the first entry of the bucket to the front of the bucket comprises to move the first entry to a front of a first region associated with the first item.

Example 45 includes the subject matter of any of Examples 41-44, and wherein to store the first item at the first entry of the bucket comprises to store the first item at the first entry, wherein the first entry is at a back of the first region of the bucket.

Example 46 includes the subject matter of any of Examples 41-45, and further comprising a plurality of instructions stored thereon that, in response to being executed, cause the computing device to determine the first region associated with the first item as a function of a priority level associated with the first item.

Example 47 includes the subject matter of any of Examples 41-46, and wherein the first item comprises a signature of an external key and a signature mapping index.

Example 48 includes the subject matter of any of Examples 41-47, and wherein to retrieve the bucket of the associative cache from the memory as a function of the hash value comprises to index a hash table with the hash value.

The invention claimed is:

1. A computing device for least recently used cache replacement, the computing device comprising:
   a processor;
   a memory;
   an associative cache manager to (i) generate a hash value as a function of a first item and (ii) retrieve a bucket of an associative cache from the memory as a function of the hash value, wherein the bucket includes a plurality of entries arranged in an order from a front to a back, wherein each entry is sized to store an item, and wherein the entries of the bucket are partitioned into a plurality of regions;
   a lookup manager to identify a first entry of the bucket that includes the first item, wherein the first entry is at a position in the bucket; and
   a vector manager to (i) execute a vector permutation processor instruction in response to identification of the first entry, and (ii) move, by the processor, the first entry of the bucket to the front of the bucket in response to execution of the vector permutation processor instruction, wherein to move the first entry comprises to preserve the order of other entries of the bucket;
   wherein the associative cache manager is further to store the bucket in the memory of the computing device in response to movement of the first entry of the bucket to the front of the bucket; and wherein to move the first entry of the bucket to the front of the bucket comprises to move the first entry to a front of a first region of the bucket, wherein the first region includes the first entry.

2. The computing device of claim 1, wherein:
the bucket comprises a 256-bit array of eight entries, wherein each entry comprises a 32-bit value; and
the vector permutation processor instruction comprises an AVX2 instruction.

3. The computing device of claim 1, wherein to execute the vector permutation processor instruction comprises to execute the vector permutation processor instruction with the bucket and a predetermined permutation pattern.

4. The computing device of claim 3, wherein the vector manager is further to select the predetermined permutation pattern from a plurality of predetermined permutation patterns as a function of the position of the first item in the bucket.

5. The computing device of claim 1, wherein the lookup manager is further to return a first data value associated with the first item in response to identification of the first entry of the bucket.

6. The computing device of claim 5, wherein:
the first item comprises a signature of an external key and a signature mapping index;
the first data value is associated with the external key; and
to return the first data value comprises to retrieve the external key from the memory with the signature mapping index of the first item and to return the first data value.

7. One or more non-transitory, computer-readable storage media comprising a plurality of instructions stored thereon that, in response to being executed, cause a computing device to:
generate a hash value as a function of a first item;
retrieve a bucket of an associative cache from a memory of the computing device as a function of the hash value, wherein the bucket includes a plurality of entries, wherein each entry is sized to store an item, and wherein the entries of the bucket are partitioned into a plurality of regions;
identify a first entry of the bucket that includes the first item, wherein the first entry is at a position in the bucket;
execute a vector permutation processor instruction in response to identifying the first entry;
move, by a processor of the computing device, the first entry of the bucket to the front of the bucket in response to executing the vector permutation processor instruction, wherein to move the first entry comprises to preserve an order of other entries of the bucket; and
store the bucket in the memory of the computing device in response to moving the first entry of the bucket to the front of the bucket;
wherein to move the first entry of the bucket to the front of the bucket comprises to move the first entry to a front of a first region of the bucket, wherein the first region includes the first entry.

8. The one or more non-transitory, computer-readable storage media of claim 7, wherein:
the bucket comprises a 256-bit array of eight entries, wherein each entry comprises a 32-bit value; and
the vector permutation processor instruction comprises an AVX2 instruction.

9. The one or more non-transitory, computer-readable storage media of claim 7, wherein to execute the vector permutation processor instruction comprises to execute the vector permutation processor instruction with the bucket and a predetermined permutation pattern.

10. The one or more non-transitory, computer-readable storage media of claim 9, further comprising a plurality of instructions stored thereon that, in response to being executed, cause the computing device to select the predetermined permutation pattern from a plurality of predetermined permutation patterns as a function of the position of the first item in the bucket.

11. The one or more non-transitory, computer-readable storage media of claim 7, further comprising a plurality of instructions stored thereon that, in response to being executed, cause the computing device to return a first data value associated with the first item in response to identifying the first entry of the bucket.

12. A computing device for least recently used cache replacement, the computing device comprising:
a processor;
a memory;
an associative cache manager to (i) generate a hash value as a function of a first item and (ii) retrieve a bucket of an associative cache from the memory as a function of the hash value, wherein the bucket includes a plurality of entries arranged in an order from a front to a back, wherein each entry is sized to store an item, and wherein the entries of the bucket are partitioned into a plurality of regions;
an insert manager to store the first item at a first entry of the bucket, wherein the first entry is at the back of the bucket; and
a vector manager to (i) execute a vector permutation processor instruction in response to storage of the first item and (ii) move, by the processor, the first entry of the bucket to the front of the bucket in response to execution of the vector permutation processor instruction, wherein to move the first entry comprises to preserve the order of other entries of the bucket; and
wherein the associative cache manager is further to store the bucket in the memory of the computing device in response to movement of the first entry of the bucket to the front of the bucket; and
wherein to move the first entry of the bucket to the front of the bucket comprises to move the first entry to a front of a first region associated with the first item.

13. The computing device of claim 12, wherein:
the bucket comprises a 256-bit array of eight entries, wherein each entry comprises a 32-bit value; and
the vector permutation processor instruction comprises an AVX2 instruction.

14. The computing device of claim 12, wherein to execute the vector permutation processor instruction comprises to execute the vector permutation processor instruction with the bucket and a predetermined permutation pattern.

15. The computing device of claim 12, wherein to store the first item at the first entry of the bucket comprises to store the first item at the first entry, wherein the first entry is at a back of the first region of the bucket.

16. The computing device of claim 12, wherein the insert manager is further to determine the first region associated with the first item as a function of a priority level associated with the first item.

17. The computing device of claim 12, wherein the first item comprises a signature of an external key and a signature mapping index.

18. One or more non-transitory, computer-readable storage media comprising a plurality of instructions stored thereon that, in response to being executed, cause a computing device to:
- generate a hash value as a function of a first item;
- retrieve a bucket of an associative cache from a memory of the computing device as a function of the hash value, wherein the bucket includes a plurality of entries arranged in an order from a front to a back, wherein each entry is sized to store an item, and wherein the entries of the bucket are partitioned into a plurality of regions;
- store the first item at a first entry of the bucket, wherein the first entry is at the back of the bucket;
- execute a vector permutation processor instruction in response to storing the first item;
- move, by a processor of the computing device, the first entry of the bucket to the front of the bucket in response to executing the vector permutation processor instruction, wherein to move the first entry comprises to preserve the order of other entries of the bucket; and
- store, by the computing device, the bucket in the memory of the computing device in response to moving the first entry of the bucket to the front of the bucket wherein to move the first entry of the bucket to the front of the bucket comprises to move the first entry to a front of a first region associated with the first item.

19. The one or more non-transitory, computer-readable storage media of claim 18, wherein:
- the bucket comprises a 256-bit array of eight entries, wherein each entry comprises a 32-bit value; and
- the vector permutation processor instruction comprises an AVX2 instruction.

20. The one or more non-transitory, computer-readable storage media of claim 18, wherein to store the first item at the first entry of the bucket comprises to store the first item at the first entry, wherein the first entry is at a back of the first region of the bucket.

21. The one or more non-transitory, computer-readable storage media of claim 18, further comprising a plurality of instructions stored thereon that, in response to being executed, cause the computing device to determine the first region associated with the first item as a function of a priority level associated with the first item.

* * * * *